Patented Feb. 27, 1951

2,543,291

UNITED STATES PATENT OFFICE 2,543,291

PRODUCTION OF UREIDO DERIVATIVES

Harry Jones, Rochdale, and John Kempton Aiken, Sale, England, assignors to The Geigy Company Limited, Manchester, England, a British company No Drawing. Application April 7, 1948, Serial No. 19,644. In Great Britain April 10, 1947

11 Claims. (Cl. 260—553)

This invention relates to improvements in the production of trichlorethylidenediureide of the following formula $CCl_3.CH.(NH.CO.NH_2)_2$.

All known processes for the preparation of this compound, e. g. the method of Coppin and Titherley, J. C. S., 1914, 32, in which monochloralurea [trichlorethylidenemonoureide], $CCl_3.CH(OH).NH.CO.NH_2$ and urea are condensed in the presence of acetic anhydride, require comparatively expensive reagents, give poor overall yields and are consequently uneconomical.

One object of the present invention is to provide a process for the preparation of trichlorethylidenediureide which does not require expensive reagents, which gives good overall yields and which consequently is economical. Another object is to provide a process for the preparation of trichlorethylidenediureide by condensing trichlorethylidenemonoureide with urea in the presence of an inorganic condensing agent. Another object is to provide a process of preparing an intermediate for the production of resinous materials.

We have found that trichlorethylidenediureide can be made by condensing trichlorethylidenemonoureide with urea in the presence of a member of the group consisting of concentrated sulphuric acid, anhydrous zinc chloride and phosphorus pentoxide.

The overall yield of this process may be as high as 60% (based on the weight of the monoureide).

Example 1

300 parts of urea are mixed with 100 parts of water to form a paste, to which 750 parts of chloral are gradually added with stirring: while the first 500 parts of chloral are added the temperature is kept below 40° C. but afterwards it is allowed to rise to 60° C. While still pasty the mass is broken up; it sets hard and is ground and allowed to dry at ordinary temperatures. The crude trichlorethylidenemonoureide so prepared in 100% yield is a satisfactory starting material for preparing trichlorethylidenediureide. 125 parts of the product are ground with 75 parts of urea and heated at 100° C. until a homogeneous melt is obtained. 18 parts of concentrated sulphuric acid are then slowly added with stirring, the temperature being kept below 95° C.; on completion of the addition the mixture is heated for two hours on a water bath the internal temperature of the mass not being allowed to rise above 110° C. during which period it solidifies to a flocculent mass. This is broken up and washed thoroughly with hot water, then with 1.5% hot aqueous caustic soda, and finally with hot water, and dried at 100° C. Analysis shows the product to be pure trichlorethylidenediureide; yield 60% of theory on the monoureide.

Example 2

As in Example 1 except that 20 parts of phosphorus pentoxide are substituted for the 18 parts of sulphuric acid. A yield of about 50% of the theoretical amount of trichlorethylidenediureide is obtained (based on the monoureide).

Example 3

As in Example 1 except that 25 parts of anhydrous zinc chloride are substituted for the 18 parts of sulphuric acid. A yield of about 50% of the theoretical amount of trichlorethylidenediureide is obtained (based on the monoureide).

The yield of 60% referred to above occurs when about 9% of concentrated sulphuric acid (based on the weight of dry reactants) is used. It might have been reasonable to assume that increased yields would result from the use of larger proportions of the acid, but in fact when this is tried certain difficulties arise, e. g. the reaction becomes very difficult to control. There is a temperature, namely 90° C., below which the components crystallise, and above which, in the presence of a proportion of acid substantially greater than 9% of the weight of the solid reactants, the reaction is very rapid and may cause the mass to solidify before all the acid has been added. In addition the reaction is very exothermic and after solidification there may be an uncontrollable temperature rise leading to decomposition. It is for this reason that when concentrated sulphuric acid is used the quantity preferred is about 9% (based on the weight of the dry reactants).

We have also found that larger quantities of concentrated sulphuric acid can be used if the condensation of trichlorethylidenemonoureide with urea is carried out in the presence also of glacial acetic acid.

The glacial acetic acid acts as a diluent and enables larger proportions of the sulphuric acid to be used, with consequent increase in yields. The proportion of concentrated sulphuric acid may be raised to as much as about 40% by weight of the solid reactants without loss of control of temperature or stirrability of the reaction mass. The proportion of sulphuric acid is preferably raised to not more than about 27%; the yield when 27% is used being thereby increased to about 75% (based on the weight of the monoureide).

Example 4

125 parts of crude trichlorethylidene-monoureide prepared as described in Example 1 are ground with 75 parts of urea, 15 parts of glacial acetic acid are then added and the mixture heated to about 75° C., at which temperature it becomes fluid. 54 parts of concentrated sulphuric acid are then added gradually with thorough stirring and sufficient cooling to keep the temperature at 70–80° C. When addition is complete heating is recommenced, the temperature being raised to 100° C. in about an hour and maintained there for two hours. At no time must the internal temperature of the mass be allowed to rise, owing to heat of reaction, above 110° C. During the final period of heating the material solidifies to a hard mass and therefore, when the addition of sulphuric acid is complete, it may be preferable to remove it while still pasty from the mixing vessel into trays in which the final heating is conducted.

The product is broken up, and ground with hot water, filtered, and washed with 4 lots of 600 parts of boiling water. Yield of trichloroethylidene-diureide, 75% of theory on the monoureide.

*Example 5*

125 parts of crude trichlorethylidene-monoureide, prepared as described in Example 1 are ground with 75 parts of urea, and 15 parts of glacial acetic acid are added with thorough mixing. 54 parts of concentrated sulphuric acid are then added gradually with thorough stirring at such a rate that the temperature of the mass, when addition is complete, has risen to 70–80° C., this temperature increase being caused by the heat of reaction of the components. External heating is then applied, the temperature being raised to 100° C. in about an hour and maintained there for two hours. At no time must the internal temperature of the mass be allowed to rise, owing to heat of reaction, above 110° C. The remainder of the preparation is conducted as in Example 4.

In the examples referred to above, which are purely illustrative and not in any way limiting, all parts are parts by weight.

We declare that what we claim is:

1. A process for the preparation of trichlorethylidenediureide which comprises condensing monochloralurea with urea in the presence of a dehydrating agent selected from the group consisting of concentrated sulphuric acid, anhydrous zinc chloride, and phosphorous pentoxide and in which the internal temperature of the reaction mass does not exceed 110° C.

2. A process for the preparation of trichlorethylidenediureide which comprises condensing monochloralurea with urea in the presence of a dehydrating agent selected from the group consisting of concentrated sulphuric acid, anhydrous zinc chloride, and phosphorus pentoxide, and in which the internal temperature of the reaction mass is maintained between 90° C. and 110° C.

3. A process for the preparation of trichlorethylidenediureide which comprises condensing monochloralurea with urea in the presence of not more than about 9% of concentrated sulphuric acid (based on the weight of the dry reactants) and in which the internal temperature of the reaction mass does not exceed 110° C.

4. A process for the preparation of trichlorethylidenediureide which comprises condensing monochloralurea with urea in the presence of not more than about 10% of phosphorus pentoxide (based on the weight of the dry reactants), and in which the internal temperature of the reaction mass does not exceed 110° C.

5. A process for the preparation of trichlorethylidenediureide which comprises condensing monochloralurea with urea in the presence of concentrated sulphuric acid and glacial acetic acid, and in which the internal temperature of the reaction mass does not exceed 110° C.

6. A process for the preparation of trichlorethylidenediureide which comprises condensing monochloralurea with urea in the presence of concentrated sulphuric acid and glacial acetic acid, and in which the internal temperature of the reaction mass does not exceed 110° C. and in which not more than about 40% of concentrated sulphuric acid (based on the weight of the dry reactants) is used.

7. A process for the preparation of trichlorethylidenediureide which comprises condensing monochloralurea with urea in the presence of concentrated sulphuric acid and glacial acetic acid, and in which the internal temperature of the reaction mass does not exceed 110° C. and in which not more than about 27% of concentrated sulphuric acid (based on the weight of the dry reactants) is used.

8. A process for the preparation of trichlorethylidenediureide which comprises condensing monochloralurea with urea in the presence of not more than about 9% of concentrated sulphuric acid (based on the weight of the dry reactants) and in which the internal temperature of the reaction mass is maintained between 90° C. and 110° C.

9. A process for the preparation of trichlorethylidenediureide which comprises condensing monochloralurea with urea in the presence of not more than about 10% of phosphorus pentoxide (based on the weight of the dry reactants) and in which the internal temperature of the reaction mass is maintained between 90° C. and 110° C.

10. A process for the preparation of trichlorethylidenediureide which comprises condensing monochloralurea with urea in the presence of concentrated sulphuric acid and glacial acetic acid in which the internal temperature of the reaction mass is maintained between 90° C. and 110° C. and in which not more than about 40% of concentrated sulphuric acid (based on the weight of the dry reactants) is used.

11. A process for the preparation of trichlorethylidenediureide which comprises condensing monochloralurea with urea in the presence of concentrated sulphuric acid and glacial acetic acid in which the internal temperature of the reaction mass is maintained between 90° C. and 110° C. and in which not more than 27% of concentrated sulphuric acid (based on the weight of the dry reactants) is used.

HARRY JONES.
JOHN KEMPTON AIKEN.

REFERENCES CITED

The following references are of record in the file of this patent:

UNITED STATES PATENTS

| Number | Name | Date |
|---|---|---|
| 2,264,400 | Ott et al. | Dec. 2, 1941 |

FOREIGN PATENTS

| Number | Country | Date |
|---|---|---|
| 128,462 | Germany | Feb. 11, 1902 |

OTHER REFERENCES

Coppen et al.: J. Chem. Soc. (London), vol. 105 (1914), pp. 32 to 36.